United States Patent
Murali

(10) Patent No.: US 9,946,323 B1
(45) Date of Patent: *Apr. 17, 2018

(54) ENCRYPTED WAKEUP CONTROLLER APPARATUS AND METHOD FOR ULTRA LOW POWER WIRELESS COMMUNICATIONS

(71) Applicant: Redpine Signals, Inc., San Jose, CA (US)

(72) Inventor: Partha Saranthy Murali, Cupertino, CA (US)

(73) Assignee: Redpine Signals, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/277,324

(22) Filed: Sep. 27, 2016

Related U.S. Application Data

(63) Continuation of application No. 13/783,275, filed on Mar. 2, 2013, now Pat. No. 9,477,292.

(51) Int. Cl.
  *G06F 1/32* (2006.01)
  *G06F 9/44* (2018.01)
  *H04W 52/02* (2009.01)
  *H04W 84/12* (2009.01)

(52) U.S. Cl.
  CPC .......... *G06F 1/3209* (2013.01); *G06F 1/3296* (2013.01); *G06F 9/4418* (2013.01); *H04W 52/0235* (2013.01); *G06F 1/3203* (2013.01); *H04W 84/12* (2013.01)

(58) Field of Classification Search
  CPC ............................ G06F 1/3203; G06F 1/323

USPC ......................................................... 713/323
See application file for complete search history.

(56) References Cited

U.S. PATENT DOCUMENTS

| | | | | |
|---|---|---|---|---|
| 4,645,309 A | * | 2/1987 | Harris | G02F 1/332 348/769 |
| 5,309,153 A | * | 5/1994 | Gaskill | G04G 21/04 340/7.33 |
| 2004/0052231 A1 | * | 3/2004 | Ramaswamy | H04W 48/18 370/338 |
| 2006/0198473 A1 | * | 9/2006 | Chiodini | H04B 1/7075 375/343 |
| 2007/0055501 A1 | * | 3/2007 | Aytur | H04B 1/7183 704/219 |
| 2007/0060162 A1 | * | 3/2007 | Xhafa | H04W 28/20 455/450 |

(Continued)

*Primary Examiner* — Jaweed A Abbaszadeh
*Assistant Examiner* — Volvick Derose
(74) *Attorney, Agent, or Firm* — File-EE-Patents.com; Jay A. Chesavage

(57) ABSTRACT

A wake-up processor for a communications processor has a receive signal amplifier for amplifying the signal level of received RF which has been transmitted as wireless local area network WLAN packets, an amplitude detector for indicating the envelope of the RF energy in the packets, a threshold detector which thresholds the detected RF envelope, and a correlator which compares the detected and thresholded RF envelope with a private pseudo-random number to determine the level of correlation between the received value and the private value. When the correlation exceeds a required threshold, a wake-up signal is asserted which is used to bring a WLAN processor into an active state for processing of subsequently sent packets.

18 Claims, 5 Drawing Sheets

(56) References Cited

U.S. PATENT DOCUMENTS

| | | | |
|---|---|---|---|
| 2007/0223525 A1* | 9/2007 | Shah | H04W 72/02 370/468 |
| 2008/0076364 A1* | 3/2008 | Hall | H04W 52/0229 455/127.1 |
| 2009/0067356 A1* | 3/2009 | Sakamoto | H04W 52/0229 370/311 |
| 2009/0147667 A1* | 6/2009 | Kang | H04L 27/2647 370/203 |
| 2009/0285105 A1* | 11/2009 | Hisamatsu | G06F 1/3203 370/241 |
| 2010/0067624 A1* | 3/2010 | Sankabathula | H03G 3/3052 375/345 |
| 2010/0118692 A1* | 5/2010 | Wakutsu | H04W 52/0235 370/210 |
| 2010/0309959 A1* | 12/2010 | Lakkis | H04L 27/2007 375/150 |
| 2011/0019562 A1* | 1/2011 | Cattuto | G01S 5/0252 370/252 |
| 2011/0211591 A1* | 9/2011 | Traub | H04L 47/34 370/474 |
| 2012/0147763 A1* | 6/2012 | Lee | H03G 3/3073 370/252 |
| 2015/0036567 A1* | 2/2015 | Park | H04L 27/2613 370/311 |

\* cited by examiner

WLAN Transceiver
Prior Art

Wake-up subsystem with Low Power WLAN Processor

Wake-up Processor

Transmit Protocol

Wakeup Packet Processing

Toll Booth Application

Wake-up Packet Formation & Reception

Multicast & Unicast Example

Multicast & Unicast Example

Transmit key formed from individual WLAN packets

CTS, transmit key with command, response

Wake-up Processor

ENCRYPTED WAKEUP CONTROLLER APPARATUS AND METHOD FOR ULTRA LOW POWER WIRELESS COMMUNICATIONS

The present patent application is a continuation application of patent application Ser. No. 13/783,275 filed Mar. 2, 2016, which claims priority to provisional patent application 61/606,342 filed Mar. 2, 2012.

FIELD OF THE INVENTION

The present invention relates to an apparatus and method for conserving power in a wireless communications device. In particular, the invention relates to a wakeup controller for use with ultra low power wireless devices operating according to the 802.11 family of wireless local area network (WLAN) standards.

BACKGROUND OF THE INVENTION

FIG. 1 shows a prior art low power WLAN processor 102, which is coupled to data bus 101 which delivers data to be transmitted by WLAN processor 102 from data bus 101 to transmit RF output 108. Wireless packets, for example according to one of the IEEE 802.11 family of wireless internetworking standards, including at least 802.11, 802.11a, 802.11b, 802.11g, or 802.11n, and operative at the 2.4 Ghz or 5 Ghz frequency channels, are received on antenna 110, and are passed through transmit-receive (TR) switch 104 to WLAN processor 102 receive RF input 106, where the packets are quadrature mixed with an appropriate 2.4 Ghz or 5 Ghz carrier to baseband, the packet symbol timing is recovered using the preamble part of the packet, header information is recovered from the packet header part of the packet, the payload symbols are demodulated, and the packet payload data is recovered, aggregated with other packet payloads according to packet header information, including the packet source and destination addresses and packet sequence number, and the recovered payload data is delivered to host interface 101 such as to a host computer or other device receiving the recovered WLAN data.

Transmit packets are similarly formed by converting a block of transmit data from interface 101 into packet payloads, modulating the packet payload into baseband symbols according to a packet modulation type, adding a header preceding the payload to form a baseband packet, and quadrature modulating the baseband packet with a 2.4 Ghz or 5 Ghz carrier, amplifying the modulated packet and coupling it to antenna 110 via TR switch 104.

A problem arises in the use of WLAN Processor 102 where the system is operative in an ultra-low power battery environment, and where the WLAN processor 102 powers on infrequently for operation at periodic intervals. One power savings method is to use beacon frames, where the WLAN processor 102 synchronizes to these beacon frames, utilizing a sleep timer to power down at other times, and then powers up some number of beacon frame intervals later to listen for packets requiring response. This method only works when beacon frames are constantly available, and when wake-up intervals are known in advance.

Another method for powering on a WLAN receiver is the utilization of an "out of band" signal, such as a 125 Khz or other low frequency near-field source, where the "out of band" signal is used to wake up the nearby WLAN processor, after which the WLAN processor may send and receive packets. This system has the disadvantage of requiring a separate wake-up signaling mechanism apart from the WLAN communication system. It is desired to provide an external wake-up signal using an ultra low power method which either uses harvested energy or requires a miniscule level of energy to detect a wake-up event and thereafter power-up a WLAN processor 102, using only WLAN signal processing elements.

OBJECTS OF THE INVENTION

A first object of the invention is a wake-up processor having an RF amplifier coupled to an amplitude detector, the amplitude detector coupled to a threshold detector, the threshold detector coupled to a correlator, the correlator comparing a received sequence of '1's formed by entire packets spanning one or more time slots and '0's formed by the absence of a transmitted packet spanning one or more time slots, the correlator generating a wake-up signal when the received sequence of '1's and '0's matches the internal receive key sequence.

SUMMARY OF THE INVENTION

A wake-up processor receives a modulated RF signal such as a wireless packet transmitted according to one of the IEEE 802.11 standards, which is amplified and converted to baseband, such as by using a diode, a mixer, or other envelope energy detection method. The detected envelope, such as formed by rectifier packet energy, is passed to a threshold detector, thereafter to a correlator which compares the received sequence with an internal sequence of a receive key, and the correlation result is passed to a threshold detector which generates a wakeup signal which enables a WLAN processor or other device in a power-down mode to initiate a power-up sequence, thereafter operating in a WLAN mode, thereby creating an on-demand WLAN processor responsive to broadcast or unicast transmit keys.

In one example of the invention, a wake-up transmit processor forms transmit key sequences by transmitting WLAN packets of a length selected to substantially span one or more adjacent time slots where one or more '1's are present in the transmit key, and timing interpacket gaps to span one or more adjacent time slots where one or more '0's are present in the transmit key.

In another example of the invention, a wakeup receive processor determines the presence or absence of packet energy over a series of time slots by rectification or mixing to baseband, threshold detects the rectified or mixed baseband energy into a stream of '1's and '0's, cross correlates the received stream of '1's and '0's with at least one of a unicast receive key or a multicast receive key, sums the result of the correlation, threshold compares the summed result, and generates a wakeup signal to a WLAN processor when the summed correlation exceeds a threshold.

BRIEF DESCRIPTION OF THE DRAWINGS

FIG. 4A-1 is a time slot diagram of a transmit key.

FIG. 4A-2 is a time slot diagram for a transmit key.

DETAILED DESCRIPTION OF THE INVENTION

Figure 2:
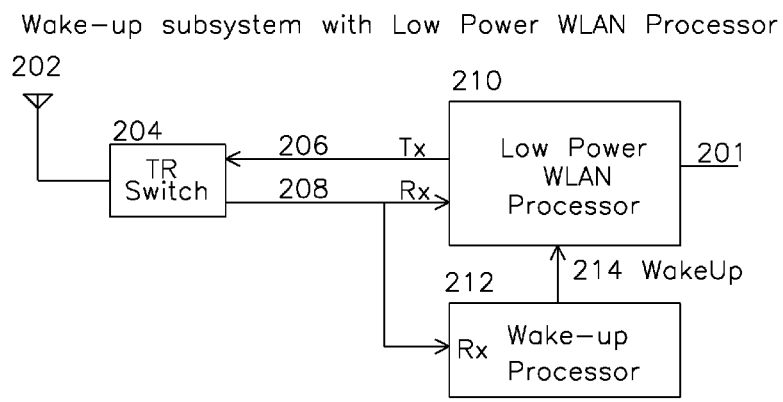
FIG. 2 is a block diagram for a WLAN processor receiving a wakeup signal from a wake-up processor.

FIG. 2 shows a WLAN processor 210 which receives packets from antenna 202 through transmit-receive (TR) switch 204. After the WLAN processor 210 completes a "wake-up" process, received packets are input to WLAN processor 210 where they are mixed to baseband, symbol timing is recovered from the packet preamble of each packet, and a payload is demodulated from the associated packet. The WLAN processor 202 receive RF interface 208 also provides received RF to the wake-up processor 212, which searches for a match with a particular pseudo-random number sequence (or key) 312, and when the particular pseudo-random number sequence 312 is detected in the incoming envelope of the RF, issues a wakeup 214 signal to the WLAN processor, which triggers a power-up process leading the full functionality of the WLAN processor 210. Until wakeup and completion of the power-up process, the WLAN processor 210 is not consuming any power, but is unable to respond to RF provided to receive RF input 208, or generate transmit RF packets on interface 206 for coupling to antenna 202 through TR switch 204. After wakeup, the WLAN processor 210 receives a stream of transmit data on bus interface 201, forms the transmit data into baseband packets including a preamble and a payload which is formed from the transmit data, the packets thereafter modulated to RF such as 2.4 Ghz or 5 Ghz, amplified, and delivered to transmit interface 206. In wakeup mode, the WLAN processor 210 also receives packets from RF interface 208, which are mixed to baseband, have symbol timing recovered, the payload demodulated and converted into receive data delivered to interface 201.

Figure 3:
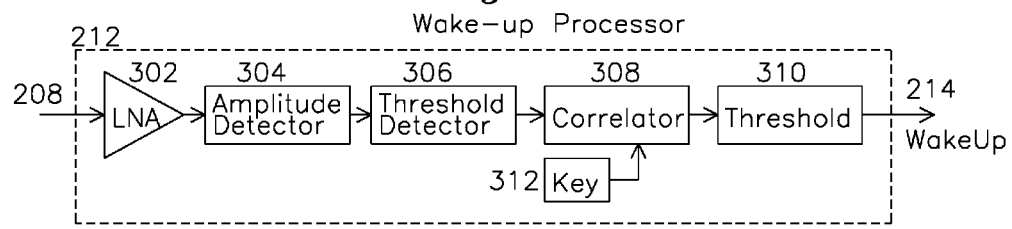
FIG. 3 is the block diagram for a wake-up processor.

FIG. 3 shows one example of an ultra low power wake-up processor 212 which receives RF 208 and generates a wakeup signal 214. Input RF 208 from an antenna is delivered to low noise amplifier 302, which increases the signal amplitude and delivers the amplified signal to amplitude detector 304 which operates as an envelope detector to provide a determination of when signal energy is present such as from a transmit key with '1's and '0's formed from one or more separate WLAN packets and when signal energy is not present on the channel. The output of the amplitude detector 304 is delivered to a threshold detector 306, which is provided to correlator 308 for comparison of the threshold-applied envelope with an internal pseudo-random sequence value of key 312 which is selected for minimum cross correlation error, such as a Gold code. The output of the correlator 308, which performs a bit-by-bit correlation of the internal key 312 value to the RF envelope values received is delivered to a threshold detector 310, which keeps count of the number of matching bits in the correlation sequence, compares that value to a threshold, and asserts wakeup signal 214 when the threshold 314 is exceeded by the correlation count from correlator 308. A variety of power sources may be used to power the wake-up processor 212 or low power WLAN processor 210, including primary cell sources such as $LiSOCl_2$, $LiFeS_2$, $LiMnO_2$, rechargeable cells NiCd or lithium ion, harvested energy such as from mechanical or piezoelectric sources which may be stored in a capacitor or small cell, or any type of power source which provides sufficient power for 212 to operate and wake up the WLAN processor 210 and transmit any required data or perform any required action.

Figure 1:
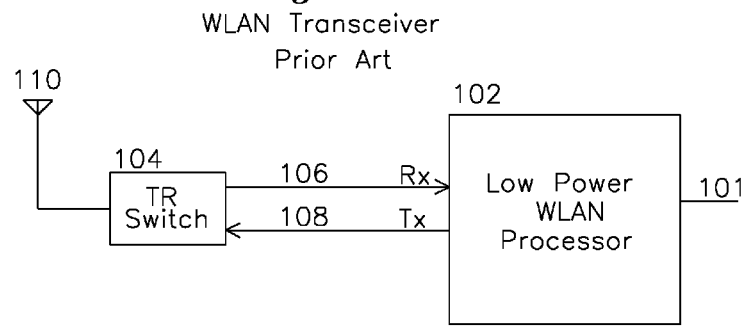
FIG. 1 is the block diagram for a prior art WLAN processor.
Figures 1, 4A:
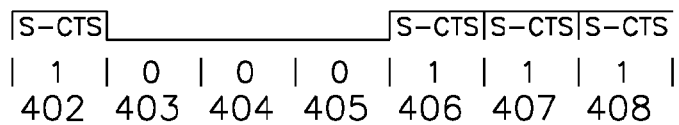
Figures 2, 4A:
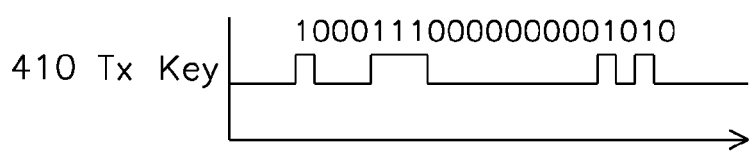

FIG. 4A-1 shows a transmit protocol according to one example of the invention. A transmitter sends individual frames of wireless data in sequential 20 us time slots 402, 403, 404, 405, 406, 407, 408. In one embodiment of the invention, a wake-up event starts with the sending of a self-CTS frame from the transmitter, which provides an interval of time when the other stations are not transmitting, and during this interval, the transmitter sends a transmit key, as will be described. In a preferred embodiment of the invention, the transmitter, such as an access point, transmits "Self CTS" frames, whereby the transmitter sends CTS frames addressed to itself, such as the CTS control frame ordinarily used to reserve the communications channel for an interval of time. In the present invention, the purpose of these frames is significantly different than their intended purpose, as the transmitted "Self CTS" frames transmitted generate a temporal pattern of binary energy corresponding to a "transmit key", where the presence of a transmitted packet spanning a particular sequential time slot represents a "1" and the absence of packet transmission spanning a sequential time slot indicates a "0". At the ultra-low power receiver which is monitoring this as serial data and searching for a key match to determine when to generate the wakeup 214 signal, simple energy detection circuitry such as a diode demodulator may be employed which compares the energy envelope to a receive key such as by cross correlation. In a preferred embodiment of the invention, the transmit key which generates the transmit packet timing pattern is selected on the basis of having a high self-correlation and low cross-correlation with the receive key matching the transmit key. One class of codes with this property is the class of Barker codes commonly used in conjunction with BPSK modulation which uses cross correlation of Barker codes for demodulation. However, in the present example embodiment, the entire transmitted packet is used to represent a single data bit of the transmit key, and a packet with twice this length is two adjacent '1' bits, etc. '0's are represented by the absence of transmission in a time slot. In this manner, packets of data, which are ordinarily asynchronous to other packets, are transmitted on sequential time slots to preserve time synchronization of the time slots. FIG. 4A-1 shows the first seven bits of transmitted data, and FIG. 4A-2 shows the sending of a transmit key 410, where the transmit key is "10001110000000001010", with each "1" transmitted as a complete packet in a fixed time slot. Other non-operative frames may also be used in place of the self-CTS frame, such as CTS/RTS frames (transmission of a RTS request frame or transmission of a CTS frame), or any type of packet which provides a fixed packet length and is suitable for providing transmit energy over a time slot and which may be used to form the sequence of data bits as described previously. In one embodiment of the invention, the transmit key is 64 bits and the time slot for each bit is 30 us. Several consecutive "1" bits may be transmitted by selecting a single frame of required length, corresponding to integer multiples of time slots, rather than sending only frames which are the duration of a particular time slot.

Figure 6:
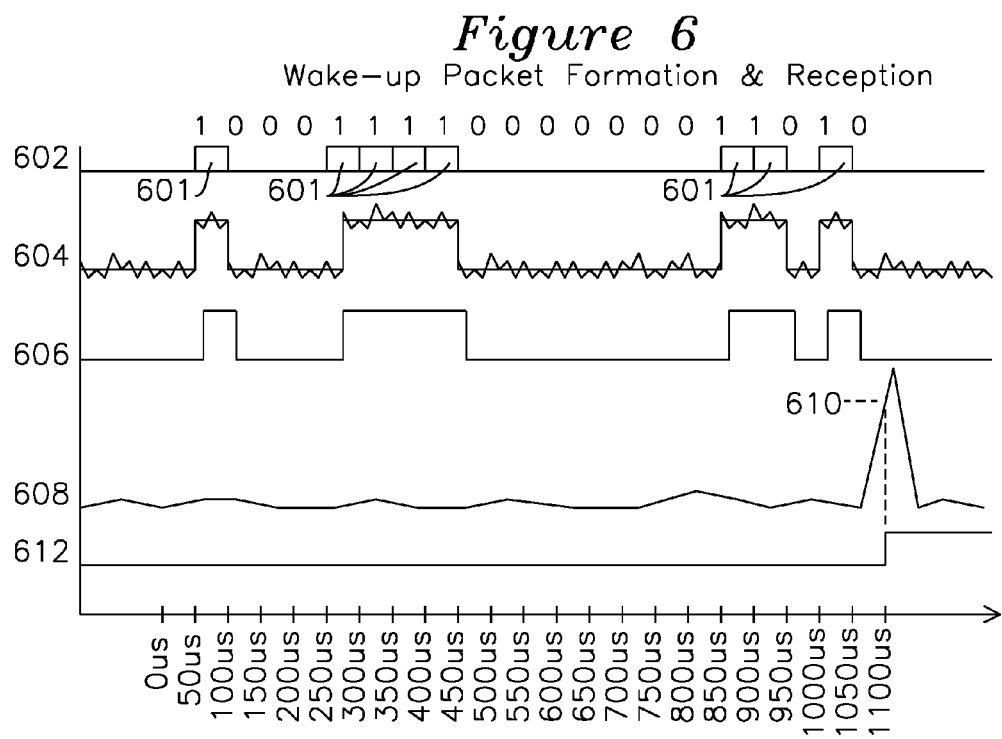
FIG. 6 is a timing diagram for wake-up packet formation and reception.
Figure 9:
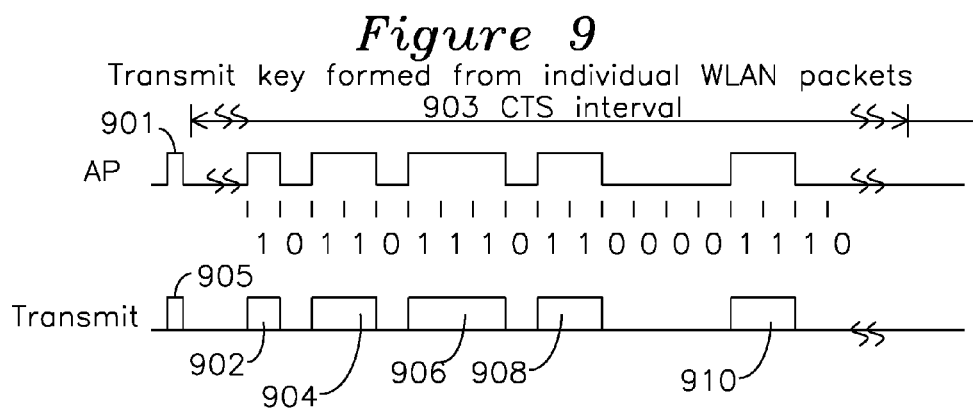
FIG. 9 is an example transmit key formed by WLAN packets.

FIG. 9 shows the transmit key of FIG. 6 formed by the AP using four individual packets of carefully selected length and transmit timing to fall within each time slot as '1' for transmission of the WLAN packet and '0' for non-transmission of a packet. The AP transmits a CTS packet 901, which causes other WLAN devices to stay off of the shared channel for the duration of time 903, after which WLAN packets are transmitted in successive time slots as '1' or '0'. For example, WLAN packet 902 uses a length selected to occupy a single time slice to form a single '1', and packet 904 is subsequently transmitted with a length selected to occupy two adjacent time slices to form '11', WLAN packet 906 is transmitted with a length corresponding to three time slices to form '111', and WLAN packet 908 is selected to form '11', as is packet 910, with inter-packet transmit delays set to provide the required number of '0's in appropriate time slots, as shown in FIG. 9.

Because the duration of a time slot is determined only by the length of the packet, the duration of a time slot is also programmable. Any time slot duration corresponding to a wireless packet length may be used, and the examples which follow will recite various packet lengths, which may also be used to provide a level of addressing. For example, the same transmit key may be used at different time slot rates to achieve responsiveness with a particular set of ultra low power receive stations simply by changing the packet length to achieve a variation in time slot, which will cause the cross correlation to fail to match on those stations with the same key but operating with a different time slot interval.

Figure 4B:
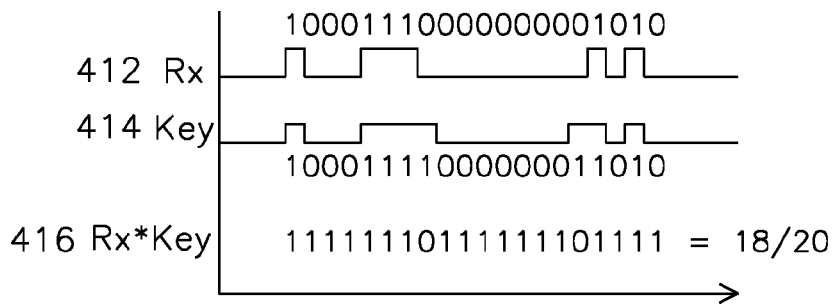
FIG. 4B is a timing diagram for wake-up packet processing which generates a wake-up signal.

FIG. 4B shows a plot for an example of wakeup packet processing where a pseudo-random private key 414 which has been selected for minimum cross-correlation response, with the multiplication operation being a binary exclusive OR operation such that the receive packet envelope detection is provided to first threshold function 306 of FIG. 3 which generates Rx waveform 412, which is cross-correlated using the exclusive OR function with key 414 resulting in a cross correlation product Rx(*)Key 416, where the exclusive OR operation (*) contributes a 1 value for the single value correlation 0(*)0 or single value correlation of 1(*)1, and a 0 value for the single value correlation 1(*)0 or 0(*)1. In the example Rx stream 412, two of the bit positions are corrupted by noise or other influence, so of the 20 bit positions of the key, and scaling by the number of bit positions in the key, 18 of these bit positions match (correlate to 1), producing the correlator output value 18/20, whereas correlation with a random 0/1 receive sequence might be expected to produce an average scaled output value of 10/20. As is known to one skilled in the art, longer key sequences will generate an output value with a stronger match response over the response produced by similar length intervals of random noise, however the shorter sequence is shown for understanding the operation of the invention.

An ultra-low power receiver which performs a wake-up operation using cross correlation of a key with a series of packets transmitted in time slices and thereafter comes out of a sleep or powerdown state to operate as a WLAN station is known as a "tag". The wakeup interval during which packets are transmitted should be free of packet transmissions by other stations, which may be accomplished by transmitting a self-CTS frame or an RTS/CTS frame, which causes other stations to not transmit for a CTS interval of time sufficient for the transmit key to be sent without interference from other stations.

Figure 5:
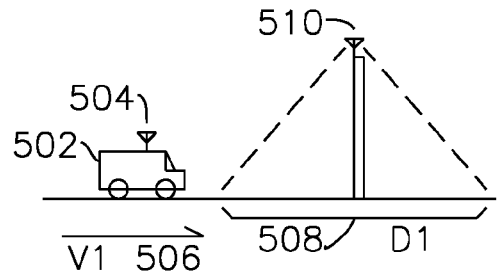
FIG. 5 is a diagram of a toll booth example with a mobile station passes through an area of coverage of an access point.

FIG. 5 shows a toll booth example application for a tag, where an access point 510 generates the key value sequence in time using fixed length 50 us packets (time slots) with each 50 us time slot packet producing an RF envelope used as a '1' in the figure, and inter-packet spacing chosen to generate the '0' value in the example of FIG. 4A-2. A truck 502 moving toward a toll booth or data exchange station with a velocity V1 506 has an antenna 510 with a usable range of operation 508 D1 where bidirectional communications may occur, for example for paying a toll or exchanging information with the passing vehicle 502 after bring the mobile WLAN processor coupled to antenna 504 out of power-down using detection of the sequential key for wake-up assertion as described in FIG. 2. The duration of time for which a vehicle 502 with antenna 504 traveling at V1 meters per second over distance D1 is within range is of antenna 510 is D1/V1. For the example of a truck traveling at 20 m/s through a booth having a usable signal range D1 of 20 m, the duration for data acquisition is 1 second, or a duration which is 20,000 packets of 50 us length.

The example of FIG. 5 was selected to show a tag moving through a transmitter zone 506 at a relatively high velocity. It can be understood that for stationary tags such as inventory tags, the tag may be programmed to wake up and transmit a response just once in a particular time interval, or to delay sending a response based on an internal identifier such as a MAC address, such that a single transmitter activating a large collection of tags is able to receive responses with a minimum risk of collision and battery-draining retransmission.

FIG. 6 shows the above example where the example key 10001111000000011010 is transmitted using individual 50 us packets 601 and individual 50 us inter-packet gaps as shown in time diagram 602. In actual practice, the transmit key and corresponding receive key is much longer than the present 20 bit example, which shown is for simplicity and understanding of the invention. The '1' bits are generated by WLAN packets with lengths chosen to occupy the required number of adjacent '1' positions, and '0' bits are formed by inter-packet delays with lengths corresponding to the number of adjacent '0' bits required. Waveform 604 shows the result of amplitude detection of the packets such as at the output of 304 of FIG. 3, and 606 shows the threshold amplitude detection of the packets such as at the output of 306. Correlation with the key results in cross correlation waveform 608, and when the result of the cross-correlation exceeds threshold 610, the Wakeup signal 612 is asserted, which may be used to initiate WLAN communications.

Figure 7:
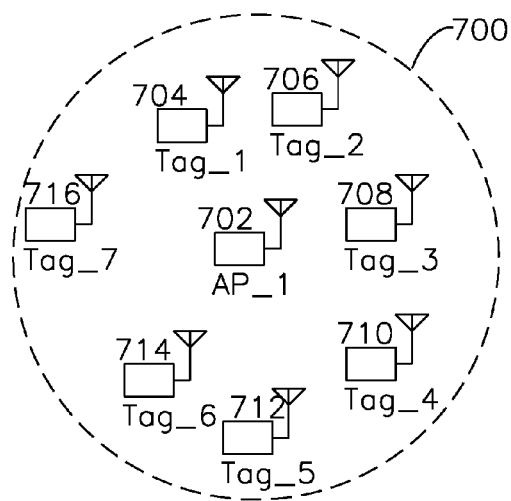
FIG. 7 is a diagram of Tags responsive to unicast and broadcast keys.
Figure 8:
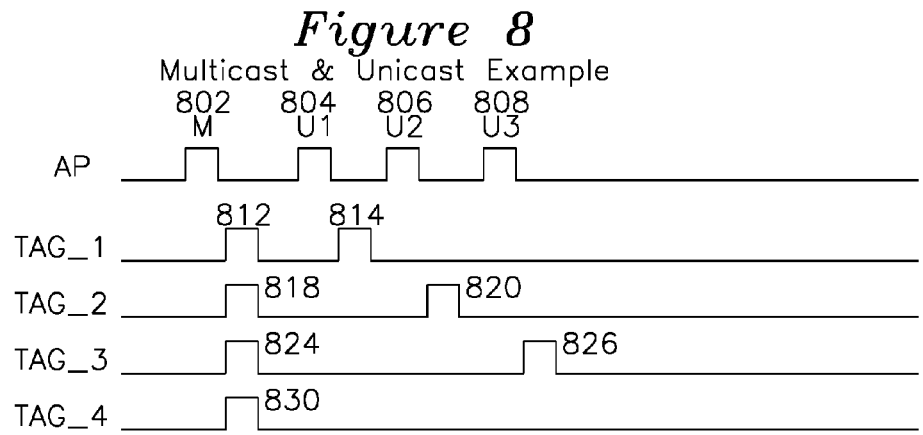
FIG. 8 is a timing diagram of unicast and broadcast key transmission.
Figure 11:
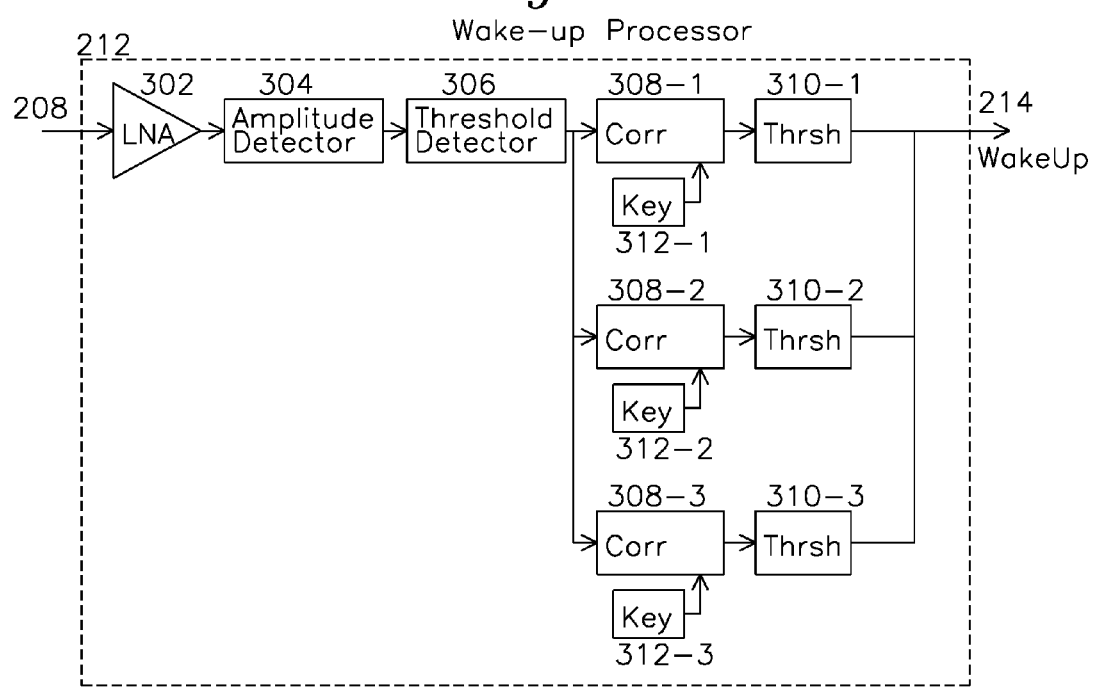
FIG. 11 is a block diagram of a wakeup processor having multiple receive keys.

In another embodiment of the invention shown in FIG. 11, the tag wake-up processor 212 includes a tag-specific unicast receive key 312-1 and correlator 308-1, and also a multicast (or broadcast) receive key 312-2 which is common to other tags, and is compared using correlator 308-2. Additional keys 312-3 etc may be added with additional correlators 308-3 for response to other unicast or broadcast keys, as required. In this manner, a transmitter such as 510 of FIG. 5 or 702 of FIG. 7 can address a single tag within a group of tags within range with the unicast key, or it can transmit to all tags or a subset of tags using the broadcast key. The example of FIG. 7 shows access point AP_1 702 which is able to communicate with tags 704 through 716 in a region 700. Each of the low power tags 704 through 716 is maintained in a powerdown state until a wakeup key is detected, and in the present example, the wakeup keys comprise a first unicast receive key which is unique to each tag, and a second multicast receive key which is common to all the tags. FIG. 8 shows the access point AP_1 702 of FIG. 7 transmitting a multicast message 802 and unicast messages 804, 806, and 808 which are constructed from individual WLAN packets in the particular time slots so as to correspond to the receive keys of Tag_1, Tag_2, and Tag_3, respectively. Tag_1, Tag_2, Tag_3, and Tag_4 all respond to multicast 802, wake-up is asserted, which causes the WLAN interface to respond with response messages 812, 818, 824, and 830, respectively. For unicast transmission with a unique receive key, Tag_1 alone responds 822 to unicast 804 having a transmit unicast key which matches its receive key by asserting wakeup signal 214 of FIG. 2, and any other information from the receive tag is coupled to WLAN processor 210 of FIG. 2 which responds accordingly, shown in FIG. 8 as the transmission of WLAN packet 814. Similarly, AP unicast 806 which carries the unicast transmit key for Tag_2 causes a wakeup signal to be asserted and bring the associated WLAN processor, such as 210 of FIG. 2, to send WLAN response packet 820, and unicast 808 which carries the transmit key for Tag_3 similarly causes a WLAN processor wakeup and transmission of WLAN response 834. In the context of the present invention, transmission of a multicast key or broadcast key may result in any number of tags responding, or all tags responding with associated WLAN wakeup signals and WLAN responses, and unicast transmission may result in a single tag responding. The terms "unicast", "broadcast", and "multicast" are used for description only, as it is clear from the incorporation of multiple receive keys in FIG. 11 that the number of responsive systems is determined by the number of tags with receive keys which match the transmitted key.

Figure 10:
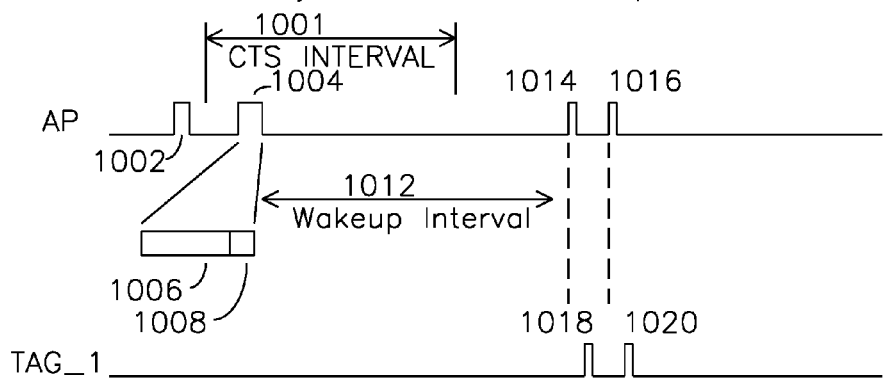
FIG. 10 is an example CTS, wakeup, and WLAN communications sequence.

FIG. 10 shows another embodiment of the invention, where the transmit sequence includes the access point sending a CTS frame 1002 to reserve the shared media for an interval of time 1001. The access point subsequently transmits a series of WLAN packets which form the 1's and 0's of the transmit key 1006 as previously described, which is followed by a command 1008 which is similarly constructed using 1's and 0s formed by entire WLAN packets to create a binary energy present or absent during successive time slots, as was described previously. The command 1008 which is appended to the transmit key 1006 may be an instruction to transmit a value known to the specific tag, a command to download code from the AP, or any other command which a WLAN device may execute after a wakeup interval. In the example of FIG. 8, the command 1008 corresponds to a wakeup request and transmission of information 1018 and 1020 using WLAN packets from the tag on the channel, so after a WLAN wakeup interval 1012, data packets 1018 and 1020 containing the requested information are transmitted. Similarly, it is possible for the subsequent action to be a software download or upgrade from the AP to the tag, or any other action which relies on information contained by the tag or downloaded to the tag.

In another embodiment of the invention, the transmitter sends a variety of different transmit keys to wakeup processors with corresponding matching receive keys, with each tag or set of tags responsive to one or more of the different transmit keys.

In another embodiment of the invention, the transmit key is followed by a set of instructional bits indicating a particular action to take upon wakeup, such as the downloading of a firmware upgrade or software upgrade, a response frame such as a tag status, or other wake-up command or mode to be entered upon power-up of the associated WLAN after receipt of the transmit key which matches the tag receive key In another embodiment of the invention, the tag device maintains a local time clock such that upon wakeup, it has access to a current time, and the transmit key utilizes a current time to generate a transmit key. In this manner, both the transmit key which is sent and the receive key which is used for cross-correlation are generated using their respective clocks, and both keys are changing over time, which prevents a rogue transmitter from exhausting the battery supply of the tag through repetitive wake-up commands, where a rogue transmitter which observes the pattern of wakeup transmit keys learns them and sends them illicitly.

I claim:

1. A wake-up processor having:
   an RF amplifier coupled to an antenna, the RF amplifier having an output;
   a key which changes value over time;
   an amplitude detector detecting the presence of RF from said RF amplifier output and forming an output;
   a threshold function asserting an output when said amplitude detector generates a value greater than an amplitude threshold;
   a correlator forming a correlation value between sequential values of said key and the sequential output of said threshold function output;
   a correlator threshold asserting a wake-up signal when said correlator output exceeds a correlator threshold value;
   where each said sequential value of said key has a duration substantially equal to the duration of a wireless packet received by said antenna;
   the detection of a packet indicating a "1" value and the absence of a packet indicating a "0" value;
   where each said key is selected from a set of possible keys which have a maximum ratio of self-correlation to cross-correlation with a pseudo-random sequence.

2. The wake-up processor of claim 1 where said correlator performs a bit-wise exclusive OR wherein 1(*)1=1, 0(*)0=1, 0(*)1=0, and 1(*)0=0.

3. The wake-up processor of claim 1 where said correlator performs a bit-wise exclusive OR operation on each bit of said key to form a correlation result.

4. The wake-up processor of claim 1 where said antenna is also coupled to a WLAN processor which enters a power-up sequence upon assertion of said wake-up signal.

5. The wake-up processor of claim 1 where said key is at least 20 bits in length.

6. The wake-up processor of claim 1 where a bit sequence forming a command is received following the receipt of said key.

7. The wake-up processor of claim 1 where said wake-up processor utilizes power harvested from said RF to power said amplifier, said amplitude detector, said threshold detector, said correlator, said key, and said correlator threshold generator.

8. The wake-up processor of claim 1 where said correlator has an accumulator.

9. The wake-up processor of claim 1 where said correlator has a shift register having as many bits as said key.

10. A method for generating a wake-up signal from received RF packets, the method operative on a wake-up processor having an RF amplifier and an RF energy detector for detecting the presence of RF energy, the RF packets coupled, in sequence, to an antenna, said RF amplifier, and said RF energy detector, said RF energy detector having an output coupled to a correlator coupled to a receive key having a plurality of bits, the receive key changing value over time, each receive key having maximum ratio of self-correlation to cross correlation with a pseudo-random bit sequence, each key derived from a local counter which is synchronized to a remote counter, the method comprising:

assigning a one value to the detection of energy from an RF packet and a zero value at other times;

forming a serial stream from said one values and said zero values, each one value having a time duration of an associated entire packet;

modifying the serial stream with a value from said local counter;

the correlator correlating said serial stream with a current receive key plurality of bits values, thereby forming a correlation result;

asserting a wake-up signal when said correlation result exceeds a threshold.

11. The method of claim 10 where said current key matches a current key used by a transmitter to generate said serial stream.

12. The method of claim 10 where said key has at least 20 bits.

13. The method of claim 10 where said serial stream has a key part followed by a command part.

14. The method of claim 10 where said correlating said serial stream generates a one value for each bit position of the serial stream which has the same value as the corresponding bit position of a receive key and a zero value for each bit position of the serial stream which as a different value as the corresponding bit position of said receive key, and the correlation result is the sum of all one values divided by the total number of bit values.

15. The method of claim 10 where said correlation threshold is set to a value which is at least ¾ of the maximum value which the correlator would generate for a self-correlation of the key with itself.

16. A wake-up processor having:

an RF amplifier coupled to an antenna, the RF amplifier having an output;

an amplitude detector detecting the presence of RF from said RF amplifier output and forming an output;

at least one correlator, each correlator:

having a threshold function asserting an output when said amplitude detector generates a value greater than an amplitude threshold;

forming a correlation value between sequential values of a key and the sequential output of said threshold function output;

having a correlator threshold asserting an output signal when said correlator output exceeds a correlator threshold value;

where each said sequential value of said key has a duration substantially equal to the duration of a wireless packet received by said antenna;

the detection of a packet indicating a "1" value and the absence of a packet indicating a "0" value;

where said key is selected to have a maximum ratio of self-correlation value to cross-correlation with a pseudo-random sequence said wake-up processor asserting a power-up output when at least one said correlator output signal is asserted.

17. The wake-up processor of claim 16 where at least one said correlator key changes value over time.

18. The wake-up processor of claim 16 where at least one correlator key changes value based on a local clock to match a transmitted key value.

* * * * *